3,202,635
MODIFIED MELAMINE RESINS
Joachim Galinke, Dusseldorf-Holthausen, Germany, assignor to Henkel & Cie. G.m.b.H., Dusseldorf-Holthausen, Germany, a corporation
No Drawing. Filed Sept. 28, 1960, Ser. No. 58,900
Claims priority, application Germany, Oct. 23, 1959, H 37,724
2 Claims. (Cl. 260—67.6)

For the production of molded pieces, melamine resins are used to good advantage. The resins thereby are employed as precondensates either in solid form or as aqueous or aqueous-alcoholic solutions. For the production of laminates, especially those of paper, textiles or veneer, the binders for the covering upper layer also advantageously are melamine resins, while the lower layers mostly are bound by means of the less expensive phenolic or urea-formaldehyde resins. In the same manner, the covering layer of compound plates, like chip plates, wood fiber plates and the like, usually is a carrier material impregnated with melamine resin. Furthermore, melamine resins generally are employed for finishing objects made of wood or other materials.

In order to obtain high-quality products, it is necessary in all instances to remove, as completely as possible, the volatile components present in the resin, particularly solvents. This must be accomplished prior to the final shaping and hardening. It is required because an excessive portion of volatile ingredients materially decreases the mechanical and electrical properties of the products made with these resins and causes such undesirable effects as poor adhesion, blisters, pinholes, loss of gloss and similar faults. However, with decreasing volatile content, the flowability of the resins also decreases, so that, in practice, compromises must be reached in such a manner that the volatile content of the precondensates to be hardened is lowered only to such an extent that the resin still has flow properties sufficient for the treatment to be carried out.

It is the object of the invention to devise a process for the production of modified melamine resins which exhibit considerably improved flow properties over the melamine resins hitherto known and which, hence, are eminently suited for the production of molded articles, of laminates and for the finishing of surfaces of all kinds. The resins according to the invention have sufficient flow properties even when the volatile content is greatly reduced for the purpose of improving the other properties of these resins. Consequently, it is, e.g., feasible to apply lesser amounts of resins than heretofore in the production of molded pieces or of laminates.

According to the invention, melamine resins of the commonly used compositions are co-condensed with subordinate quantities of substituted melamines which contain at least one alkanol radical having 2 to 4 carbon atoms in their molecules.

Substituted melamines of that kind are, e.g., N-ethanol melamine, N-propanol melamine, N-isopropanol melamine, N-butanol melamine, N-diethanol melamine, N.N'-diethanol melamine, N-diisopropanol melamine, N.N'-tetraethanol melamine, N.N'.N''-triethanol melamine, N.N'.N''-hexaethanol melamine, and others. The melamine derivatives named either are known compounds or else can be produced in a simple manner, e.g., by reaction of monochloro diamino triazine, dichloro monoamino triazine, or cyanuric chloride, with ethanol amine, diethanol amine, propanol amine, isopropanol amine, dipropanol amine or diisopropanol amine, dioxypropanol amine, butanol amine-1.4 or with mixtures of these materials.

Because the condensation of the aminotriazines with formaldehyde preferably is carried out in aqueous solution, the preferred alkanol melamines for the purpose of the invention are water-soluble themselves. By "water-soluble" I mean that their solubility in water is not substantially less than that of the unsubstituted melamine. Hence, the alkanol radicals of the substituted melamines should not contain more than 4 carbon atoms. The hydroxyl groups present in these radicals preferably are primary hydroxyl groups. One single alkanol radical also may carry several hydroxyl groups.

The melamines substituted by alkanol radicals are co-condensed with the resin, either singly or in mixture, in comparatively small quantities, ranging from approximately 0.0005 to approximately 0.05 mol per mol melamine. A co-condensation with larger amounts, e.g., 0.1 mol per mol melamine, and even more, though feasible, does not produce substantially improved flow properties of the resin obtained over the above-named quantities.

It furthermore has been found that the flow properties of the melamine resins according to the invention can even be further improved by co-condensing, beside the substituted melamines above described, amides of aromatic carboxylic acids or sulfonic acids with the melamine resins. Preferred are such amides which are sufficiently soluble in aqueous or aqueous-alcoholic condensate solutions which are weakly alkaline. Suitable amides, for instance, are benzene sulfonamide, ortho- or para-toluene sulfonamide, naphthaline-alpha- or -beta- sulfonamide, benzamide, para-toluylic acid amide, and others. Also useful for the purpose at hand are amides which are substituted on the nitrogen atom by a further radical, e.g., N-methyl-benzene sulfonamide, N-phenyltoluene sulfonamide, N-ethyl benzamide, para-toluene disulfimide and others. In lieu of the acid amides, their low-molecular condensation products with formaldehyde can be employed, e.g., N-methyltoluene sulfonamide.

The amounts of amides co-condensed may vary within wide limits. For the production of melamine resins of improved flow properties, the amounts added are 0.05 to 0.5 mol per mol melamine. Hence, according to the invention, mixtures can be co-condensed containing, per mol melamine 0.0005 to 1 mol of an N-alkanol melamine and 0.05 to 0.5 mol of one of the amides named.

For the production of the thus modified melamine resins, melamine and formaldehyde, preferably in a molar ratio of 1:2 to 1:6, are condensed in the customary manner with addition of the above-named substituted melamines and, if desired, of the amides named. Generally, the formaldehyde is in form of the commonly marketed aqueous solutions, containing approximately 30–40 percent formaldehyde. Preferably, the condensation is carried out at a pH of 7.5 to 10 and at a temperature of approximately 50 to 100° C., and preferably at approximately 80° C. It is of advantage to hold the pH constant during the condensation. The desired termination of the condensation, which can be selected according to the different end uses of the resin obtained, easily is determined by the well-known dilution or precipitation test.

When carrying out the condensation, the reaction components can be added in varying sequences. For instance, melamine and formaldehyde and the alkanol melamine can be condensed in the customary manner, the acid amide can then be added, and condensation continued. It also is feasible to add a condensation product of formaldehyde and an aromatic acid amide, e.g., the N-methyltoluene sulfonamide, in form of an aqueous solution, to a pre-condensate of melamine and formaldehyde, in which an alkanol melamine or a mixture of several alkanol melamines is co-condensed. It goes without saying that all participants in the condensation can be reacted simultaneously. Furthermore, an unmodified melamine-formaldehyde precondensate can be mixed with a precondensate which contains a correspondingly larger quantity of an alkanol melamine (or of a mixture of several alkanol melamines) and, if desired, also of an acid amide. Finally, precondensates consisting of formaldehyde and the alkanol melamines named and, if desired, also of acid amides, can be used as additives to melamine-formaldehyde precondensates.

After the condensation, the precondensates according to the invention can be further treated in the customary manner. They can, e.g., be converted into a powder by spray-drying or by drying on drums. Also, the aqueous solution of the precondensate, which, as compared with solutions of unmodified melamine resins, has a prolonged storage capability, can directly be used for the usual end uses. The storability of the resins according to the invention can even be more increased by the incorporation of the customary condensation retarders, such as borax or hexamethylene tetramine. Hardening of the resins according to the invention is accomplished as with unmodified melamine resins, i.e., by heating with or without the use of catalysts.

The hardened resins according to the invention substantially exhibit the same advantageous properties of unmodified melamine-formaldehyde resins, but with the highly important additional feature of greatly improved flow properties.

The invention now will be further explained by the following examples. However, it should be understood that these are given merely by way of illustration, not of limitation, and that numerous changes may be made in the details without departing from the spirit and the scope of the invention as hereinafter claimed.

The volatile content and/or residual moisture was determined in these examples by heating the finely divided and pre-dried mixtures of resin and filler for 10 minutes at 150° C.

EXAMPLE 1

A mixture of 225 g. melamine, 500 ml. 30% aqueous formaldehyde solution (5 mols formaldehyde) and 2.14 g. N-diethanol melamine was adjusted with dilute aqueous NaOH solution to a pH of 8.5. The mixture was warmed to 80° C. with agitation and condensed at that temperature to a precipitation value of 1:1 (resin solution : water). The pH was maintained at 8.5 throughout the reaction. The solution then was cooled and filtered (resin solution B).

EXAMPLE 2

A mixture of 252 g. melamine, 500 ml. 30% formaldehyde solution and 2.14 g. N-diethanol melamine was adjusted to a pH of 8.5 with dilute aqueous NaOH. The mixture then was heated to 80° C. with agitation and held at that temperature for 30 minutes at a constant pH of 8.5. Then, 85.5 g. toluene sulfonamide were added, and the whole condensed to a precipitation value of 1:1. The condensate then was cooled and filtered (resin solution C).

EXAMPLE 3

Into a portion of resin solution B (cf. Example 1) and of resin solution C (cf. Example 2), respectively, powdered alpha-cellulose was kneaded at room temperature until a filler content of 40 percent had been attained, calculated on the total solids. The mixture then was dried in a vacuum drier at 50° C. to a residual moisture content of 5 and 8 percent, respectively. The mixture then was comminuted, powdered and pressed into pills of 0.85 g. weight each. These pills were tested as to their flow properties in a Battenfeld flow tester (flow test according to Rossi Peakes, ASTM D 569–48) at 160° C. and at a pressure of 130 kg./cm.². The data of the testing machine were as follows:

Flow channel diameter _____mm__ 3.2
Flow channel length _____mm__ 60.0
Load _____kg__ 83
Counterweight _____kg__ 0.220
Pill diameter _____cm__ 0.92

The following Table 1 shows the results obtained at a volatile content of 5 and 8 percent, respectively. Compared therewith were resin solutions A and D. The former was a melamine resin prepared in the same manner, but without addition of diethanol melamine or toluene sulfonamide. Resin solution D was the same as resin solution C, but without addition of diethanol melamine.

Table 1

| Resin | A | B | C | D | A | B | C | D |
|---|---|---|---|---|---|---|---|---|
| Percent volatile | 5.0 | 5.0 | 5.0 | 5.0 | 8.0 | 8.0 | 8.0 | 8.0 |
| Flow, mm | 5 | 11 | 38 | 30 | 6 | 18 | 48 | 35 |

EXAMPLE 4

A modified melamine resin was produced in the same manner as in Example 1, but differing therefrom in that, in lieu of N-diethanol melamine, per mol melamine 0.005 mol N-ethanol melamine (resin E), 0.0005 mol N,N'-tetraethanol melamine (resin F), and 0.005 mol hexaethanol melamine (resin G), respectively, were used. The flow properties were determined as in Example 3, and were compared with the unmodified melamine resin A. The results obtained are shown in Table 2:

Table 2

| Resin | A | E | F | G | A | E | F | G |
|---|---|---|---|---|---|---|---|---|
| Percent volatile | 5.0 | 5.0 | 5.0 | 5.0 | 8.0 | 8.0 | 8.0 | 8.0 |
| Flow, mm | 5 | 19 | 7 | 13 | 6 | 22 | 9 | 16 |

EXAMPLE 5

A modified melamine resin was prepared in like manner as in Example 1, except that a lower degree of condensation was attained. Hence, the condensation was carried only to a precipitation value of 1:5.0 (resin H). The flow properties of that resin were compared with the unmodified melamine resin A, in the manner described in Example 3. The results are found in Table 3:

Table 3

| Resin | A | H | A | H |
|---|---|---|---|---|
| Percent volatile | 5.0 | 5.0 | 8.0 | 8.0 |
| Flow | 6 | 17 | 7 | 24 |

EXAMPLE 6

A modified melamine resin was prepared in the manner described in Example 2, but differing therefrom in that, in lieu of 2.14 g. N-diethanol melamine, 3.02 g. N,N'-tetraethanol melamine were used (resin I). The flow properties were compared with those of the unmodified melamine resin A in the manner as described in Example 3. Table 4 shows the results obtained:

Table 4

| Resin | A | I | A | I |
|---|---|---|---|---|
| Percent volatile | 5.0 | 5.0 | 8.0 | 8.0 |
| Flow, mm | 5 | 45 | 6 | 50 |

EXAMPLE 7

A mixture of 630 g. melamine, 10.7 g. N-diethanol melamine and 755 ml. 37% aqueous formaldehyde solution was adjusted to a pH of 8.5 with aqueous NaOH solution and heated with agitation to 90–95° C., whereby the pH was held constant by addition of more NaOH solution. Thereafter, condensation was accomplished at 90–95° C., still maintaining the pH of 8.5, until a precipitation value of 1:3.5 had been attained. Then, immediately 85.5 g. p-toluene sulfonamide and another 75 ml.

37% formaldehyde solution were added, and the reaction mixture cooled to room temperature. During cooling, the pH was adjusted to 10. The flow properties of this resin were tested in the manner described in Example 3, and it was established that it had exceptionally good flow.

EXAMPLE 8

A mixture of 630 g. melamine, 10.7 g. N-diethanol melamine and 755 ml. 37% aqueous formaldehyde solution was adjusted to a pH of 8.5 and heated with agitation to 90–95° C. The lowering of the pH was counteracted by addition of aqueous NaOH solution during heating, and the pH of 8.5 thus was maintained. Thereafter, condensation was carried out at the same temperatures and pH, until a precipitation value of 1:3.5 had been reached. Then, immediately, 60.5 g. benzamide and another 75 ml. 37% formaldehyde solution were added. The condensation solution then was cooled to room temperature and the pH adjusted to 10.

The flow properties of this resin were established as described in Example 3. The following Table 5 shows the values obtained as resin K, compared to resin L, which had been prepared in the same manner but without the incorporation of diethanol melamine.

Table 5

| Resin | K | L | K | L |
| --- | --- | --- | --- | --- |
| Percent volatile | 5.0 | 5.0 | 8.0 | 8.0 |
| Flow, mm | 33 | 28 | 39 | 28 |

EXAMPLE 9

A mixture of 630 g. melamine, 10.7 g. N-diethanol melamine and 755 ml. 37% aqueous formaldehyde solution was adjusted to a pH of 8.5 and heated to 90–95° C. The pH was held constant by addition of aqueous NaOH solution. Thereafter, condensation was carried out at 90–95° C. and a pH of 8.5, until a precipitation value of 1:3.5 had been attained.

Then, 77.5 g. benzene sulfonamide and another 75 ml. 37% aqueous formaldehyde solution were added, and the reaction mixture cooled to room temperature, whereby the pH was adjusted to 10.0.

The flow of the resin M thus obtained was tested as described in Example 3. Resin M was compared to resin N which was prepared in the same manner but without the incorporation of diethanol melamine. Table 6 shows the results.

Table 6

| Resin | M | N | M | N |
| --- | --- | --- | --- | --- |
| Percent volatile | 5.0 | 5.0 | 8.0 | 8.0 |
| Flow, mm | 33 | 29 | 36 | 30 |

EXAMPLE 10

A mixture of 630 g. melamine, 10.7 g. N-diethanol melamine and 758 g. 40% aqueous formaldehyde solution was adjusted with dilute aqueous NaOH to a pH of 8.5 and heated with agitation to 80° C. The mixture was condensed at that temperature and at a constant pH of 8.5 for 2.5 to 3 hours, until the solution had a precipitation value of 1:3.5, measured at 20° C. The mixture then was cooled, the pH adjusted to 10.0, and diluted with water to a non-volatile content of 50 percent. After that, the solution was filtered.

A yellow decorating paper sheet, printed on one side and having a weight of 150 g./cm.$^2$, was conducted through an impregnating bath containing the resin solution described above. The excess resin was removed, by means of squeeze rollers, to such an extent that, after drying of the paper with hot air at 120° C. air temperature, the resin content, calculated on the weight of the paper, was approximately 80 percent. The volatile content of the impregnated and dried paper was 3.8 percent, as established by post-drying of samples, 10 x 10 cm., at 150° C.

Ten layers of these impregnated papers were laminated at 140° C. at a pressure of 80 kg./cm.$^2$ for 15 minutes. Afterward, the laminate was cooled to 30° C. within 25 minutes.

This laminate was compared with another laminate which was produced under otherwise the same conditions, except that the melamine resin used was unmodified. It was found that, even on merely visual inspection of the surfaces, the modified resin was a better product. For the quantitative comparison of the flow properties, round discs were cut from both the impregnated papers, having a diameter of 6.9 cm., and 9 layers of the same were laminated under the conditions given above. The resin exuding beyond the periphery of the annular body thus formed was removed, and the percentual loss of weight over the original weight of the test piece was determined. The average loss of 6 weighings of each the test piece with the modified resin and the unmodified resin, respectively, was used, and it was determined that the weight loss (or flow) of the laminate made with the modified melamine resin was 1.29 percent, that of the one made with the unmodified melamine resin only 0.88 percent.

EXAMPLE 11

630 g. melamine, 1250 g. 30% aqueous formaldehyde solution and 75.5 g. N.N'-tetraethanol melamine were condensed at a temperature of 80° C. and a pH of 8.5, as described in Example 10, to a precipitation value of 1:3.0, measured at 20° C. The resin solution then was adjusted to a pH of 9.5, cooled, diluted with water to a 50 percent non-volatile content, and filtered.

Thereafter, a decorating sheet of a weight of 150 g./cm.$^2$ was impregnated with the above resin solution in the manner described in Example 10 and pre-dried to a volatile content of 3.5 percent. The resin content was 82 percent of the weight of the paper.

This impregnated paper was used for the production of a laminate, and its flow was determined as described in Example 10. The average flow, taken of 6 measurements, was 1.34 percent.

EXAMPLE 12

A mixture of 630 g. melamine, 1,010 g. 30% aqueous formaldehyde solution and 10.7 g. N-diethanol melamine was condensed at a temperature of 90° and at a pH of 8.5 in the manner described in Example 10, until a precipitation value of 1:3.5, measured at 20° C., had been reached. After attaining that precipitation value, 85.5 g. p-toluene sulfonamide and another 100 g. 30% aqueous formaldehyde solution were added. The reaction mixture then was cooled within 20 minutes to 40° C. During cooling, the pH value was adjusted to 10.0 with aqueous NaOH solution. The resin solution then was diluted with water to 50 percent solids.

A grey decorating paper, having a weight of 175 g./cm.$^2$ was impregnated with the above resin solution and dried at room temperature for 16 hours. The resin content was 74 percent of the weight of the paper.

For the determination of the volatile constituents, samples of these impregnated papers, measuring 10 x 10 cm., were post-dried at 150° C. The volatile content was 5.99 percent.

9 discs of the thus impregnated paper, having a diameter each of 6.9 cm. were laminated at 140° C. for 15 minutes at a pressure of 80 kg./cm.$^2$. The resin exuding beyond the periphery of the annular body was taken off, and the loss of weight (or flow) was determined as percentage. The flow was 2.07 percent.

Furthermore, a laminate was prepared of the following constituents:

*Top layer.*—A decorating paper sheet impregnated according to this example.

*Center layer.*—9 Sodium kraft papers impregnated with a co-condensate of melamine-urea-formaldehyde.

*Bottom layer.*—A decorating sheet impregnated according to this example.

The lamination was carried out at 140° C. for 15 minutes at a pressure of 80 kg./cm.$^2$, followed by cooling to 30° C., within 25 minutes.

The surface gloss of the laminates thus produced was established with an electrical gloss meter (Universalmessgeraet No. 276, i.e., universal measuring device No. 276, manufactured by the firm Dr. B. Lange, Berlin, Germany). The average value of 10 measurements was noted. The values obtained were compared to a black standard plate, which was rated as 100 percent. The specimens described above and using the modified melamine resin of this example had a value of 121.5 percent.

The abrasion resistance of these laminates was determined by means of a Taber Abrader. They were subjected to 200 revolutions at a weight of 500 g. The weight loss obtained thereby was 0.45 percent.

The laminates, furthermore, were subjected to the steam test and to the test establishing the behavior toward hot pot bottoms, both according to the DIN-Entwurf 19,926 (DIN-Entwurf means tentative standards of the German Industrial Norms, a standardization organization similar to ASTM). It was established that no changes occurred in the specimens, except for a slight loss in gloss, i.e., they passed the tests.

*Example 13*

A modified melamine resin was prepared in the manner as described in Example 12, but differing therefrom in that, in lieu of 85.5 g. p-toluene sulfonamide, a mixture of 42.5 g. o-toluene sulfonamide and 30.25 g. benzamide was used.

With the resin solution thus obtained, a decorating paper sheet was impregnated, as described in Example 10, and pre-dried to a volatile content of 2 percent. The resin content was 85 percent of the weight of the paper.

This paper was employed in a laminate, which was subjected to a pressure of 80 kg./cm.$^2$ at 140° C. for 15 minutes. Thereafter, the laminate was cooled to 30° C. within 25 minutes. The laminate thus obtained exhibited very good surface properties, even without the use of an overlay.

*Example 14*

A mixture of 252 g. melamine, 500 g. 30% aqueous formaldehyde solution and 18.4 g. N-propanol melamine was adjusted with dilute aqueous NaOH to a pH of 8.5. The mixture then was heated with agitation to 80° C., whereby the pH was held constant by means of addition of NaOH. Thereafter, condensation was carried out at 80° C., still maintaining the pH, until a precipitation value of 1:2.5 had been attained. This was reached after approximately 4 hours. The solution then was cooled to 20° C. and filtered (Resin O).

In the same manner, another modified melamine resin was produced which differed from resin O, in that instead of N-propanol melamine, an equal amount of N-isopropanol melamine was employed (Resin P).

The flow of both these resins was tested as described in Example 3. Table 7 shows the results of the flow tests as compared to an unmodified resin which was prepared in the same manner as described above, but without addition of a substituted melamine (Resin Q).

*Table 7*

| Resin | O | P | Q | O | P | Q |
|---|---|---|---|---|---|---|
| Percent volatile | 5 | 5 | 5 | 8 | 8 | 8 |
| Flow, mm | 8 | 8 | 6 | 16 | 21 | 7 |

In the preceding example the precipitation values were taken in all instances, at 20° C.

I claim as my invention:

1. A modified melamine resin, comprising melamine and formaldehyde, in a molar ratio of 1:2 to 1:6, and approximately 0.0005 to 0.1 mol, per mol melamine, of a melamine having at least one alkyl radical substituted by a hydroxyl group, said alkyl radical having 2–4 carbon atoms bound on a nitrogen atom in the triazine ring of said substituted melamine, and said hydroxyl group being separated from said nitrogen atom by at least two carbon atoms.

2. A modified melamine resin comprising melamine and formaldehyde, in a molar ratio of 1:2 to 1:6, 0.05 to 0.5 mol, per mol melamine, of an amide selected from the group consisting of aromatic monosulfonic acid amides and aromatic monocarboxylic acid amides, and 0.0005 to 0.1 mol, per mol melamine, of a melamine having at least an alkyl radical substituted by a hydroxyl group, said alkyl radical having 2–4 carbon atoms bound on a nitrogen atom in the triazine ring of said substituted melamine, and said hydroxyl group being separated from said nitrogen atom by at least two carbon atoms.

References Cited by the Examiner

UNITED STATES PATENTS

| 2,377,866 | 6/45 | D'Alelio | 260—67.6 |
| 2,454,495 | 11/48 | Widmer et al. | 260—67.6 |
| 2,508,875 | 5/50 | Scott | 260—67.6 |
| 2,740,737 | 4/56 | Elmer et al. | 260—67.6 |
| 2,852,489 | 9/58 | Anas | 260—67.6 |
| 3,044,973 | 7/62 | Segro et al. | 260—67.6 |

FOREIGN PATENTS 775,808  5/57  Great Britain.

WILLIAM H. SHORT, *Primary Examiner.*

MILTON STERMAN, HAROLD N. BURSTEIN, *Examiners.*